CONTROL SYSTEMS

Original Filed April 27, 1959

INVENTOR.
JAMES R. HALL
BY
Edward J. Norton
ATTORNEY

CONTROL SYSTEMS

Original Filed April 27, 1959 3 Sheets-Sheet 2

INVENTOR.
JAMES R. HALL
BY
ATTORNEY

INVENTOR.
JAMES R. HALL
BY
Edward J. Norton
ATTORNEY

United States Patent Office 3,175,159

Patented Mar. 23, 1965

3,175,159

CONTROL SYSTEMS

James R. Hall, Canoga Park, Calif., assignor to Radio Corporation of America, a corporation of Delaware Original application Apr. 27, 1959, Ser. No. 809,017. Divided and this application July 1, 1964, Ser. No. 379,693

3 Claims. (Cl. 328—155)

The present invention relates to control systems, and more particularly to a system for controlling the speed of a moving body which is especially suitable for use in magnetic recording and reproducing apparatus. This application is a division of Serial No. 809,017, filed April 27, 1959, by the instant inventor and entitled Control Systems.

Speed control has continually presented problems in recording systems. It is recognized that deviations in speed of a record medium from a predetermined constant speed produces distortion in the recording and reproducing of sound. It is even more necessary to prevent any speed variations in the recording and reproduction of television signals. Slight speed variations produce phase shifts in the recorded and reproduced television signals which causes severe distortion of the reproduced television picture. In color television recording and reproduction, the most minute phase variations in the television signal due to slight deviation from constant speed in the recording and reproducing process distorts the color information, since the color information depends upon the phase characteristics of the recorded and reproduced signals.

In order to provide speed control which is so highly sensitive and accurate as to be suitable for television recording and reproducing apparatus, a control system must be highly sensitive to both speed variations and position errors in a moving system. It has been difficult to provide a system which is highly sensitive to position variations and is also sensitive to speed variations. Control systems which have been provided in the past have not been altogether satisfactory in providing the desired sensitivity, particularly in detecting and correcting very small speed deviations around the desired constant or "lock-in" speed of the moving system. Prior speed control systems of the sample data servo type have included system parts which were designed to operate in different speed ranges of the moving system. These different system parts, while operating satisfactorily in the respective speed ranges, have been comparatively insensitive during transition between these ranges.

It is, therefore, an object of the present invention to provide an improved control system which is highly sensitive over an entire operating range.

It is another object of the present invention to provide an improved system for speed control which is highly suitable for use in magnetic recording and reproducing apparatus.

It is still another object of the present invention to provide an improved control system of the sample data servo type.

It is a still further object of the present invention to provide an improved control system for magnetic recording and reproducing apparatus which maintains the rate of scanning of the record exactly the same on playback as it was during recording operations.

It is a still further object of the present invention to provide improved control system for magnetic recording and reproducing apparatus wherein tracks disposed transversely on a magnetic record tape are scanned by a rotating wheel carrying magnetic heads whereby the speed of the head wheel is accurately controlled.

It is a still further object of the present invention to provide a control system responsive to a reference signal which automatically compensates for variations in the reference signal.

It is a still further object of the present invention to provide an improved phase sensitive detector system having greater range over which useful information is provided.

It is a still further object of the present invention to provide a rapidly acting speed control system.

It is a still further object of the present invention to provide an improved trapezoid waveform generator which is simpler than waveform generators heretofore provided.

It is a still further object of the present invention to provide an improved frequency or time discriminator system which has controllable operational characteristics.

It is a still further object of the present invention to provide an improved direct current amplifier.

An embodiment of the invention may be incorporated in apparatus which provides control signals repetitive at a rate determined by the speed of a moving system contained in the apparatus. In a television recording and reproducing apparatus which scans transverse tracks on a magnetic tape record, a wheel carrying a plurality of magnetic heads is rotated about an axis parallel to the direction of movement of the tape. A transducer such as a tone wheel, associated with the rotating head wheel, provides repetitive signals at a rate determined by the speed of rotation of the wheel.

Briefly described, the embodiment of the invention herein described includes means responsive to the rate of the control signals to provide an error signal when the rate of the control signals varies from a given rate which given rate corresponds to the desired constant speed of rotation of the head wheel. A reference frequency is generated corresponding to this constant speed. Phase comparison means are provided to compare the control signal and the reference signal and provide error signals indicative of phase variations therebetween. The phase error signals and the rate error signals are combined and applied to control the speed of the head wheel. In accordance with a feature of the invention, the phase error signals having certain characteristics are applied to the means which detects rate variations in the control signals and operates to control the sensitivity of the rate detection means. By the combination of these detection means, the system sensitivity is increased for any slight variations in the speed of the head wheel. In this way, the head wheel may be rapidly locked into rotation at the desired constant speed.

The invention itself, both as to its organization and method of operation, as well as the foregoing and other objects and advantages thereof, will become more readily apparent from a reading of the following description in connection with the accompanying drawings in which.

Figure 1:
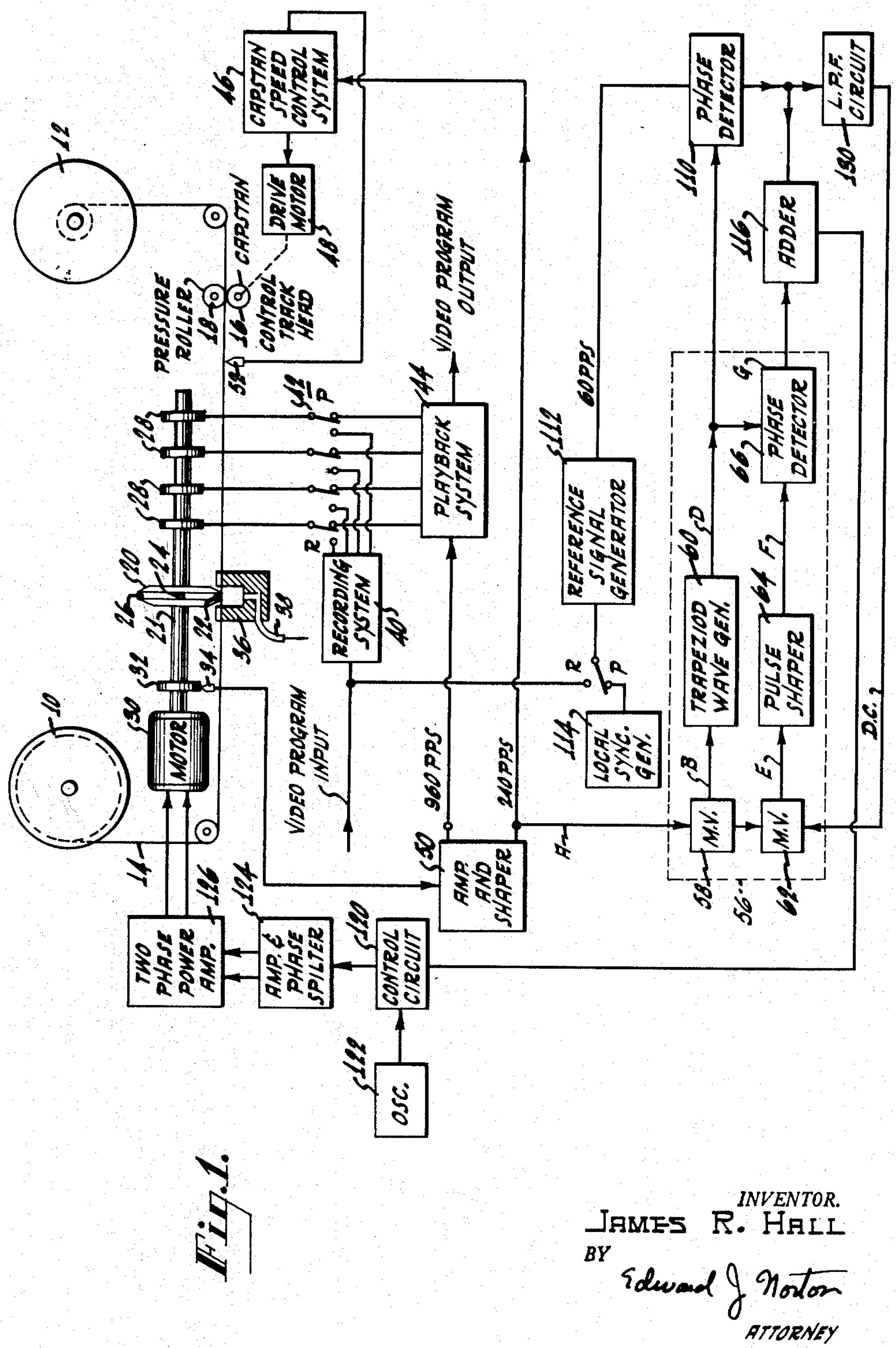
FIG. 1 is a diagrammatic representation of one embodiment of a control system provided in accordance with an illustrative embodiment of the present invention.

In the interest of clarity, all ground symbols have been omitted from FIG. 1 of the drawings. Thus, it may be assumed that a ground return is associated with each of the blocks employed in the drawing where necessary.

The present invention will be described hereinafter, by way of illustration, as it is employed in a transverse scan magnetic tape apparatus suitable for recording and reproducing television signal information. As the description proceeds, it will become apparent that the novel features of the invention are not limited to such apparatus and may be used for speed control in other apparatus having a moving system as well as in electrical systems for frequency stabilization purposes.

Referring now, more particularly, to FIG. 1 of the drawings, a tape transport mechanism is shown including a supply reel 10 and take-up reel 12. A tape record 14 is reeled from the supply reel to the take-up reel at a speed determined by the speed of rotation of a capstan 16. The tape is pressed against the capstan 16 by means of a pressure roller 18. The construction of the tape transport mechanism, the means for driving the supply reel 10, the take-up reel 12 and the capstan 16 do not form part of the present invention and are therefore not described herein. A more detailed description of the tape transport mechanism may be found in an article entitled "How the RCA Video Tape Recorder Works," by Jerome L. Grever, appearing in Broadcast News magazine, published April 1958, beginning at page 6. The tape is scanned by means of a rotating head wheel 20 which carries four magnetic heads spaced ninety degrees apart on the head wheel. Three of these heads 22, 24 and 26 are shown in the drawings. The construction of the head wheel is also described in the aforementioned article by Jerome L. Grever and is also described in an application filed on February 2, 1959, in the name of Henry Ray Warren, Serial No. 790,458, now Patent No. 3,046,359, and assigned to Radio Corporation of America. The head wheel 20 is driven by an electrical motor 30 at 240 revolutions per second, for example. Slip rings 28 are mounted on a shaft 21 connecting the head wheel to the motor 30. These slip rings are connected each to a different one of the magnetic heads and are associated with brushes (not shown) for transmitting signals to and from the heads.

A tone wheel 32 is also mounted on the motor shaft and generates a pulse in a tone wheel pick-up 34 during each revolution of the head wheel 20. The tone wheel 32 is mentioned in the referenced article by Jerome L. Grever. The wheel is a member made of a magnetically susceptible material which has an opening therein of predetermined shape. The pick-up 34 is a magnetic transducer having concentric center and outer pole pieces. The center pole piece may be of substantially the same width as the opening in the tone wheel member. As the opening in this member passes over the pick-up transducer 34, any flux flowing through the transducer is decreased and a sharp voltage pulse will appear across the output of a pickup coil placed around the center pole piece. This tone wheel arrangement is described in greater detail in an application filed on November 20, 1957, in the name of Roy C. Wilcox, Serial No. 697,711, now Patent No. 2,978,599, and assigned to Radio Corporation of America.

The tape 14 is conformed to an arc around the head wheel 20 by a vacuum shoe 36 (similar to the vacuum shoe illustrated in the aforementioned Grever article) as the tape is reeled in a direction along the axis of the head wheel 20 from the supply reel 10 to the take-up reel 12. In a typical television tape recording and reproducing apparatus, which is mentioned at this point solely for purposes of illustration, the head wheel 20 is two inches in diameter. The tape 14 is two inch wide magnetic tape which may be made of a one mil thick base of polyester plastic (Mylar) with a 0.0003 inch magnetic oxide coating. The vacuum shoe 36 holds the tape against the head wheel 20 in an arc of approximately one hundred thirteen degrees. The vacuum shoe 36 is connected to a vacuum source (not shown) by means of a hose 38. The tape is driven by the capstan 16 and pressure roller 18 arrangement at fifteen inches per second. The magnetic heads are 10 mils wide in the direction of tape travel. Thus, the scanning mechanism involving the head wheel and the vacuum shoe arrangement will scan, on the tape 14, transverse tracks having a pitch of 15.6 mils with a 5.6 mil blank space between the tracks.

Signals may be recorded on the tape by means of the recording system 40. The television program is applied to this recording system. The recording system includes an FM modulator. The television signal on its FM carrier is amplified and used to drive all four magnetic heads through the slip rings 28 as explained in the Grever article. During playback, the magnetic heads are connected through the slip rings and suitable switching arrangement shown in the drawings as a record playback switch 42 to a playback system 44. This playback system includes amplifiers, response equalizers and a switching system for reconstituting the video signal. The playback system also includes an FM demodulator. The nature of the playback system is not part of the present invention and is described in greater detail in the referenced Grever article.

The speed of the tape is controlled by means of the capstan speed control system 46. This capstan speed control system includes a variable frequency oscillator and a power amplifier for amplifying the signals from the oscillator. These amplified signals are applied to a drive motor 48 which drives the capstan. During recording operations, the signals from the tone wheel 32 are applied to an amplifier and shaper circuit 50 which will be described in greater detail hereinafter. This circuit 50 provides an accurately shaped train of pulses at a rate determined by the speed of rotation of the head wheel 20 which, in the illustrated example, will be at 240 pulses per second.

This tone wheel signal is recorded on the tape by means of a recording amplifier contained in the capstan speed control system 46 which drives a control track head 52. The head 52 records a control track along the edge of the tape 14. During playback, the tone wheel signal derived from the amplifier and shaper 50 is compared in phase with a signal reproduced from the control track to provide an error signal which controls the frequency of the variable frequency oscillator in the capstan speed control system 46. The speed of the capstan drive motor 48 is therefore controlled by the system 46 to establish the proper phase relationship between the tone wheel and control track signals. This insures that the video heads track the transverse record tracks recorded across the tape. In other words, the speed of the tape 14 is controlled so that the magnetic heads scan exactly the top of the transverse tracks on the tape and are not misaligned with the tracks.

It is necessary, however, to insure that the head wheel is rotated at exactly the proper speed (240 revolutions per second) and in exactly the proper phase during playback as was the case during recording. This constant speed and phase relationship is maintained with the embodiment of the invention which provides the illustrated control system.

The information derived from the tone wheel 32 indicates both the speed of the head wheel 20 and the position of the heads 22, 24 and 26, etc., thereon. The repetition rate of the signals derived by the pick-up transducer 34 will, of course, be indicative of the speed of the head wheel 20. It will be observed that the pick-up transducer 34 is disposed at a fixed position. Accordingly, a tone wheel pulse will be produced once during each cycle of rotation of the head wheel 20. Since the tone wheel pulse will be produced at a certain time during each cycle of the head wheel, the occurrence of the tone wheel pulse at any other time will indicate an error in the position of the heads on the tone wheel. These position errors are time errors as pointed out above. Since time may be measured in terms of phase in a cyclically repetitive system, the position of the heads on the wheel 20 may be determined by means of phase comparison with a reference signal. The means for accomplishing such phase comparison will be described in detail below.

In general, the illustrated embodiment of the present invention includes a velocity detector system 56, shown as being enclosed by the dashed lines in the drawings, which is responsive to control signals derived from the tone wheel, and a position detection system also responsive to the control signals from the tone wheel which derives position error information by comparison of the control signals with reference signals. The velocity detector and the position detector are connected together to provide an error signal which may be used with appropriate motor control apparatus for maintaining the head wheel locked in at constant speed and without any deviations in position at any instant.

The control signals from the tone wheel are applied to the amplifier and shaper circuit 50. This circuit 50 provides sharp pulses for each tone wheel pulse. Since the tone wheel pulses will occur at approximately 240 pulses per second, a 240 pulse per second signal will be provided by the amplifier and shaper circuit 50. This 240 pulse per second is applied to the capstan speed control system 46 for tape speed control purposes as pointed out above. The 240 pulse per second signals are also applied to the velocity detector system 56. The amplifier and shaper circuit 50 also includes a chain of multivibrators of conventional design which multiply the frequency of the control signals four times to provide 960 pulses per second control signals. These 960 pulses per second control signals are applied to the playback system 44 for controlling the switching of the heads during playback and for other purposes as is explained in greater detail in the referenced article by Jerome L. Grever.

Figure 2:
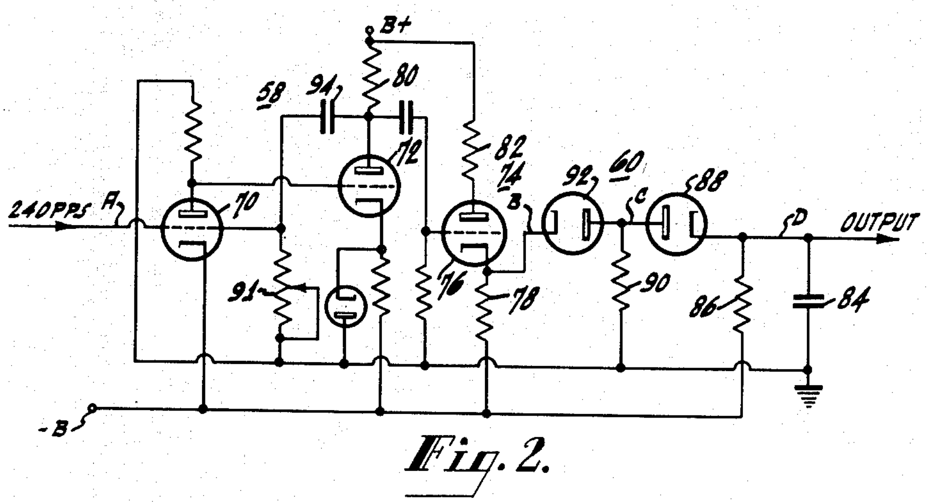
FIG. 2 is a schematic diagram of a circuit used in the system shown in FIG. 1 and provided in accordance with the present invention.

The velocity detector system includes a multivibrator 58 which is a monostable or "one-shot" multivibrator of conventional design. This multivibrator 58 is also shown in FIG. 2 of the drawings as comprising two triode tubes which are interconnected so that the states of conduction thereof will be reversed upon application of a control signal thereto. The tubes return to their normal state of conduction after a predetermined time set by the time constant of the coupling circuit therebetween and applied grid bias voltage. Multivibrator circuits of this general type are described and their operation explained in Patent No. 2,857,512.

The output square wave signal from the multivibrator 58 is applied to a trapezoid wave generator 60 also shown in detail in FIG. 2 of the drawings. This trapezoid wave generator is provided in accordance with a feature of the invention. The multivibrator 58 triggers another multivibrator 62 which is of the same general type as the multivibrator 58. The multivibrator 62, however, is operated as a variable delay circuit by means to be described in detail hereinafter. A square wave signal is generated by the delay multivibrator 62 and applied to a pulse shaper and amplifier circuit 64. The pulse shaper and amplifier circuit 64 includes differentiating, clipping and pulse amplifier circuits of conventional design which provide a pulse upon occurrence of a selected edge of the square wave signal from the delay multivibrator 62.

The signals from the trapezoid generator 60 and the signals from the pulse shaper and amplifier 64 are applied to a phase detector circuit 66. This phase detector circuit 66 is essentially of conventional design in accordance with the principles set forth in the text "Electronic Instruments" by Greenwood et al., published by McGraw-Hill Book Co., 1948 (see section 12.12). The phase detector 66 may include a pair of diodes and a charge storage capacitor. The pulses from the pulse shaper 64 will essentially key the diodes into conduction at a predetermined time. The output voltage from the phase detector is an error signal indicative of the voltage level of the trapezoid wave at the time of occurrence of the pulse from the pulse shaper and amplifier circuit 64. This error signal may be positive or negative, in accordance with the sense of the phase variations between the signals applied thereto and will have a magnitude related to the magnitude of the phase variations.

Figure 3:
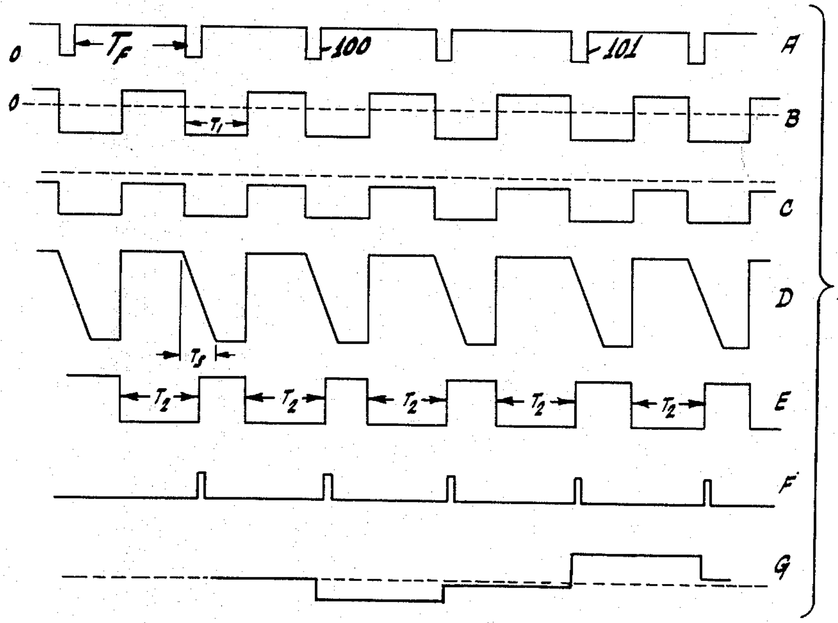
FIG. 3 is a series of waveforms of signals in the system and circuit illustrated in FIGS. 1 and 2.

The operation of the velocity detector system will be better understood in connection with FIGS. 2 and 3 of the drawings. FIG. 2 shows the multivibrator circuit 58 and trapezoid wave generator 60. The multivibrator circuit includes two tubes 70 and 72. The tube 70 is normally on and the tube 72 is normally off. The multivibrator stage 58 is coupled to a cathode follower stage 74. The cathode follower stage 74 includes a tube 76 having plate, grid, and cathode electrodes. A cathode resistor 78 is connected between the cathode electrode and source of negative voltage, indicated at −B. A source of positive voltage, indicated at B+, is also connected to the circuit, and particularly to the plate resistors 80 and 82 of the tube 72 in the multivibrator 58 and the tube 76 in the cathode follower stage 74, respectively. The trapezoid generator includes a charge storage capacitor 84. A charging circuit for that capacitor includes a resistor 86 which is connected between the capacitor and the negative voltage source. A discharge circuit for the capacitor 84 includes a unidirectional conducting device indicated herein as a vacuum tube diode 88 and a resistor 90 which is connected from the plate of the diode 88 to ground. A control means for the discharge circuit includes another diode 92. The operation of the trapezoid generator circuit shown in FIG. 2 and the velocity detector system 56 shown in FIG. 1 will be better understood by reference to the waveforms shown in FIG. 3.

The waveforms shown in FIG. 3 are idealized in that transient components and non-uniformity have been eliminated to clarify the drawings. The control signals from the amplifier and shaper circuit 50 are shown in waveform A as being a series of negative pulses. These pulses are applied to the monostable multivibrator 58. When a pulse occurs, the normally on tube is cut off for a predetermined time set by the resistance of a resistor 91 and a capacitor 94 in the coupling circuit between the grid of the normally on tube 70 and the plate of the normally off tube 72. A predetermined time, indicated in the drawing as $T_1$ elapses before the tubes assume their normal conductive states. This produces a square wave which is derived from the plate of the normally off tube and transmitted through the cathode follower 74. The signal across the cathode resistor 78 is shown in waveform B. It will be noted that the cathode resistor is connected between the cathode and the source of negative voltage. Accordingly, the voltage across the cathode resistor attains a highly negative voltage almost equal to the voltage of the negative voltage source.

The leading and lagging edges of the voltage across the cathode resistor of the cathode follower 74 determines the width of the trapezoid wave generated by the trapezoid wave generator 60. Control is effected by means of the control diode 92. In the steady state condition, when the cathode follower 74 is cut off, the control diode 92 conducts and a negative voltage is developed across the resistor 90. When the cathode follower is conducting, the control diode 92 is cut off because of the positive voltage developed in the cathode thereof. Accordingly, the voltage across the resistor 90 is almost equal to ground voltage. The voltage across the resistor 90 is shown in waveform C.

The control of the charging and discharging of the capacitor 84 provides a trapezoid wave having steep leading edge and a gradually sloping trailing edge as shown in waveform D of FIG. 3. Waveform D is the voltage across the capacitor 84. The height or amplitude limits of the trapezoid wave are set by the diodes 88 and 92 in the discharge and control circuits, respectively. It is important to note that the value of impedance presented by the resistor 86 is greater than the value of impedance presented by the resistor 90. The resistance of the resistor 86 may be one hundred times the resistance of the resistor 90. Accordingly, the charging circuit including the resistor 86 will have a longer time constant than the discharge circuit including the resistor 90.

When the diode 88 cuts off, as will take place on occurrence of a control pulse, the capacitor 84 charges toward the voltage of the negative voltage source through the charging resistor 86. The voltage across the capacitor 84 increases, in a negative sense, exponentially at a rate determined by the resistance of the resistor 86 and the capacitance of the capacitor 84. The voltage across the capacitor cannot increase below the voltage across the resistor 90 since the discharge circuit diode 88 will then conduct. Thus, the capacitor 84 charges toward a voltage equal to the voltage of the negative voltage source (—B) for a short time until a negative voltage is reached at which the diode 88 will conduct. This is a small voltage as compared to the voltage of the negative voltage source. Therefore, the sloping trailing edge of the trapezoid wave is very linear. When the diode 88 conducts, a voltage equal to a voltage at the junction of the resistors 86 and 90, which then form a voltage divider is the negative limit of the voltage across the capacitor 84.

The capacitor 84 discharges through a discharge circuit including the diode 88 and the resistor 90 when the voltage at the junction between the plates of the two diodes is reduced to near zero volts. This occurs after the time, $T_1$, when the tubes 70 and 72 in the multivibrator 58 resume their normal states of conduction and non-conduction. Since the resistance of the resistor 90 is much lower than the resistance of the resistor 86, the capacitor 84 will discharge rapidly toward ground potential. Thus, the leading edge of the trapezoid wave is practically straight whereas the lagging or trailing edge has a predetermined slope. This trapezoid wave is generated by a circuit which includes two diodes, two resistors, and a charging capacitor. It is much simpler than circuits provided in the past for the generation of trapezoids and is provided in accordance with a feature of the invention.

The signal generated by the multivibrator 58 in response to the control signals from the amplifier and shaper 50 are applied to trigger the delay multivibrator 62. These triggering signals may be derived from the grid of the normally off tube in the multivibrator 58. A pulse is derived from the trailing edge of the square wave signal (waveform B) for triggering the delay multivibrator 62. This trigger pulse is obtained, for example, by differentiating the signal obtained from the multivibrator 58 and clipping to select the pulse corresponding to the edge of the wave which occurs after the intervals $T_1$. The output wave from the delay multivibrator 62 is shown in waveform E of the drawings. It is noted that the wave E is initiated by the trailing edge of the wave B from the first multivibrator 58. The time constants in the coupling circuit of the delay multivibrator 62 are adjusted to provide a time delay $T_2$ before the tubes in the delay multivibrator 62 resume their normally conductive states. Thus, the trailing edge of the wave from the delay multivibrator will occur at a time equal to the summation of the times $T_1$ and $T_2$ after occurrence of the control pulse (waveform A). The time $T_2$ is slightly greater than the time $T_1$ so that the lagging edge of the wave $T_2$ will occur when the sloping edge of the trapezoid wave D attains approximately one-half of its total amplitude, assuming that the control pulses A occur at a constant repetition rate with uniform intervals therebetween. The time for the trapezoid wave to pass through its sloping portion is shown in wave form D as $T_s$. Thus, the delays in the multivibrators 58 and 62 are adjusted so that the lagging edge of the wave from the delay multivibrator occurs at a time $T_1+T_2$ which equals the interval between successive control pulses which are indicated in the drawing as $T_f$ and an additional time interval which is equal to $\frac{1}{2}T_s$. In other words, the delay provided by the multivibrators is such that the lagging edge of the wave from the delay multivibrator occurs a short time after the control pulse. Since the delays $T_1$ and $T_2$ are constant, the lagging edge of the pulse from the delay multivibrator 62 is timed by one of the control pulses to occur a short time after the next succeeding control pulse.

Differentiating, clipping and pulse amplifying circuits in the pulse shaper 64 provide a short pulse indicated in waveform F of FIG. 3 upon occurrence of the lagging edge of the signal from the delay multivibrator 62. This short pulse is a sampling pulse which is applied to the phase detector 66 together with the trapezoid wave. The phase detector 66 produces a direct current voltage having a polarity and magnitude indicative of the time delay between succeeding pulses of the control pulse signal and therefore of the frequency or repetition rate of the control pulse signal. It will be observed that, as shown in waveform G, when the sampling pulse occurs exactly at the midpoint of the trapezoid wave which will be the case when the repetition rate of the control pulse signals is uniform substantially zero output (error) voltage is obtained from the phase detector. When a control pulse, such as the pulse 100, occurs slightly in advance of its proper time of occurrence, as will be the case when the repetition rate of the control signals increases due to speed-up of the head wheel 20, a negative voltage will be obtained from the phase detector. This is because the sampling wave samples the trapezoid wave along the lower portion of the sloping edge thereof. As the control voltage tends to bring the head wheel back to proper speed, the error signal from the phase detector will decrease in magnitude. If, for example, a control pulse, such as the pulse 101, occurs too late, as would be the case if the head wheel 20 slows down, the sampling pulse (waveform F) will sample the trapezoid wave (waveform D) at the upper end of the sloping edge thereof to provide a positive error signal which indicates a decrease in head wheel speed. Waveform G shows a step waveform to indicate the progressive charging of the storage capacitors in the phase detector 66, and also to indicate the instantaneous change in velocity of the head wheel which is sampled during each cycle of rotation thereof. Because the sampling rate is much higher than the rate of change of velocity, the output voltage from the phase detector will be a direct current voltage which varies slowly in polarity and magnitude rather than the large discrete steps indicated by the waveform shown in the simplified waveforms of FIG. 3.

A geometrical analysis of the operation of the velocity detector system will show that zero output (error) voltage will be obtained when the control signals have a frequency indicated in the following equation wherein $f_0$ is the center frequency and $T_0$ is the period of the signals having a frequency $f_0$;

$$f_0=\frac{1}{T_0}=\frac{2}{2(T_1+T_2)-T_s}$$

It will be observed that any variations from this frequency $f_0$ will be detected as an error voltage. Thus, the velocity detector system which is provided in accordance with a feature of the invention is also useful as a frequency or time discriminator in providing signals for frequency stabilization purposes.

Position information may be obtained by means of another phase detector 110. This phase detector 110 may be essentially the same as the phase detector 66 used in the velocity detector system 56. The trapezoid waves from the trapezoid wave generator 60 are also applied to the phase detector 110. It will be noted that these waves are timed with the control signals. Reference signals for comparison with the trapezoid waves are obtained from a reference signal generator 112. The reference signal generator 112 includes amplifier circuits and conventional vertical sync separator circuits of the type used in television receivers to provide a pulse signal during recording or from signals supplied from a local sync generator 114 during playback. The local sync generator may be a conventional studio sync generator such as the TG–2A Studio Sync Generator manufactured by Radio Corporation of America, Camden, New Jersey, and described in their Instruction Bulletin IB–36155. Alternatively, the sync generator 114 may be provided by a local or distant television signal which is passed through another sync separator similar to the sync separator contained in the reference signal generator 112. Reference may be had to Grob, "Basic Television Principles and Servicing," page 362 et seq., for a detailed description of sync separator circuits.

Alternatively, a reference signal may be provided by suitably shaping local line currents to provide a pulse signal repetitive at 60 pulses per second. A signal having a repetition rate of sixty pulses per second is selected as a reference signal rate, since the repetition rate thereof is related to the repetition rate of the control signals and in particular the reference signal repetition rate is an integral submultiple of the repetition rate of the control signals. The reference signal samples the control signal, which is represented by the trapezoid wave, every fourth cycle of the trapezoid wave. Control signals of other frequencies when used may be selected to sample the control signal wave every cycle, every other cycle, or every third cycle, instead of every fourth cycle as is the case illustrated herein. The comparison is between a pulse and a trapezoid wave as was the case in the velocity detector system 56.

At this juncture certain advantages of trapezoid and pulse wave comparison will be set forth. The primary advantage is that a greater range of variation in phase, time of occurrence, or frequency of the sampled waves over which useful information may be obtained is provided by comparison with a trapezoid wave, than is the case with other non-sinusoidal waveforms, such as sawtooth waves. For phase, time or frequency variations which cause the sampling wave to occur at a point off the sloping edge of the trapezoid, a constant maximum error signal will be produced. The possibility of lock-in on a divergently sloping portion of the wave, as would be the case in sawtooth wave comparison systems, is remote. The error signal provided by the phase detector is therefore effective in providing useful information over a wider range of variations than in conventional non-sinusoidal waveform generators. Stabilization or lock-in at a frequency or phase corresponding to the center portion of the sloping edge of the trapezoid wave is accomplished quickly since even widely divergent signals provide the correct information in the form of an error signal to the control apparatus which will operate to restore the proper phase, time or frequency relationship between the signals applied to the phase detector.

The phase detector 110 produces an error signal which indicates the instantaneous position of the heads in the head wheel, as was explained above.

Figure 4:
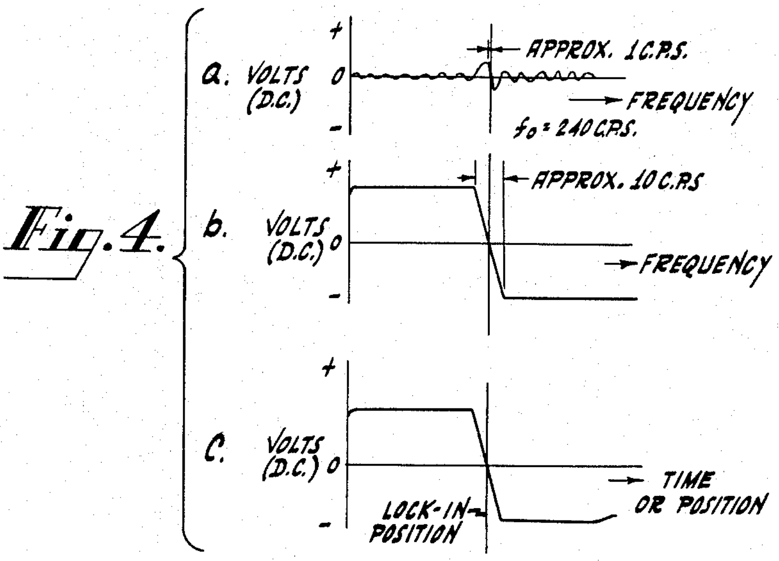
FIG. 4 is a series of curves showing the transfer characteristics of the system illustrated in FIG. 1.

It will be observed that the trapezoid wave has a sloping portion during which position errors are indicated. This sloping portion has a duration in the illustrated case of approximately 100 microseconds, which gives a very high sensitivity to phase or instantaneous position error. The transfer characteristic of output voltage with respect to frequency of control signal for the phase detector is shown in curve (*a*) of FIG. 4 of the drawings. The phase detector 110 in the position error sensitive system is highly sensitive in the immediate vicinity of the desired constant frequency of the control signals which is known as the lock-in frequency of the system. This constant frequency is indicated in FIG. 4 as $f_0$ and is equal to 240 cycles per second in the illustrated case. This is also the speed of the head wheel 20.

The velocity detector system 56 has a transfer characteristic which is illustrated in FIG. 4 of the drawings as curve (*b*). The voltage output from the phase detector 66 is a constant static output at frequencies much below lock-in frequency which will be the case when the head wheel is being brought up to operating speed of 240 cycles per second. Also, a static output signal of opposite polarity is obtained from the phase detector 66 when the head wheel 20 is rotating at somewhat greater than desired lock-in speed. A dynamic error is obtained over a range of approximately 10 cycles per second around the lock-in speed. It will be noted, however, that the voltage obtained from the velocity detector system for velocity errors is much greater than the voltage obtained from the phase detector system and also that the velocity detector system is operative over the entire frequency range or speed range of the moving system including the head wheel 20.

The output error signal from the position phase detector 110 and the output error signals from the velocity phase detector 66 are applied to an adder circuit 116. This adder circuit 116 is a resistive adder circuit of conventional design. The error signals from the two phase detectors 110 and 66 are linearly summed in the adder circuit 116. The combined error signals derived from the output of the adder circuit 116 will provide control over the moving head wheel system throughout the requisite speed range, as indicated in the transfer characteristic of voltage output against time or position of curve (*c*) of FIG. 4.

Outside of a critical range near lock-in position, constant control voltages, either positive or negative, depending upon the sense of the deviation, are obtained. These error signals are applied to a control circuit 120. The control circuit 120 may be a pair of impedance control tubes which operate as a balanced modulator to amplitude-modulate the signals from an oscillator 122. The oscillator 122 may be a phase shift oscillator which provides oscillations having a frequency of 340 cycles per second.

The amplitude of the oscillations is controlled by the modulator in accordance with the combined error signals from the adder 116. These modulated signals are applied to an alternating current amplifier and phase splitter 124. This circuit amplifies the modulated oscillations transmitted through the control circuit 120 and applies these voltages to a phase splitting network. The output of the phase splitter is two voltages ninety degrees out of phase with each other. These voltages are applied to a two phase power amplifier 126 which may be two amplifiers each of which amplifies a different phase voltage. The two phase voltages are applied to the motor 30. This motor 30 may be a two phase synchronous motor which is operating below synchronous speed. Accordingly, as the amplitude and power to the motor is varied in accordance with the control signals, the motor will either speed up or slow down so as to maintain the head wheel rotating at constant speed and in the proper position during each cycle of rotation. Other motor speed control systems may be alternatively used. For example, an electromagnetically actuated brake may be used to control the speed of the motor. The error voltage from the adder circuit 116 may be used to control the frequency of an oscillator which provides power for driving a motor, as is the case for the capstan speed control system 46.

Additional stabilization, faster response and compensation for any variations in the frequency of the reference signal is provided by the cooperative combination of the position phase detection system and the rate or velocity detection system 56. A low pass filter circuit 130 is connected between the output of the position phase detector 110 and the delay multivibrator 62 to provide a direct current signal which varies in amplitude to control the delay imparted by the delay multivibrator 62. This low pass filter 130 may be a simple, resistance capacitance network designed to transmit signals having a frequency characteristic around frequencies below one cycle per second. Long term variations in position of the head wheel are represented by such slow frequency changes in the output signals from the phase detector 110. Such long term changes would occur if the reference signal drifted in frequency. The delay in the multivibrator would be changed, either lengthened or shortened, to compensate for such drift in reference frequency.

The time delay, represented as $T_2$ on the waveform shown in FIG. 3, may be altered by changing the bias on the grid of the multivibrator 62. The multivibrator 62 has a normally on tube and a normally off tube similar to the tubes 70 and 72, respectively, in the multivibrator 58 illustrated in FIG. 2. The delay multivibrator, however, has a coupling resistor similar to the resistor 91 which is connected to the grid of the normally on tube. The voltage (the D.C. return voltage) across a resistor in the delay multivibrator 62, similar to the resistor 91, is varied to vary the instant when the multivibrator tubes resume their normal conductive states.

It is desirable to limit any speed or position variations to a minimum so that these variations will be within the range of the position phase detector 110. This is accomplished by the combined operation of the velocity detector and the position phase detector as is illustrated in the operational characteristics shown in FIG. 5 of the drawings.

Figure 5:
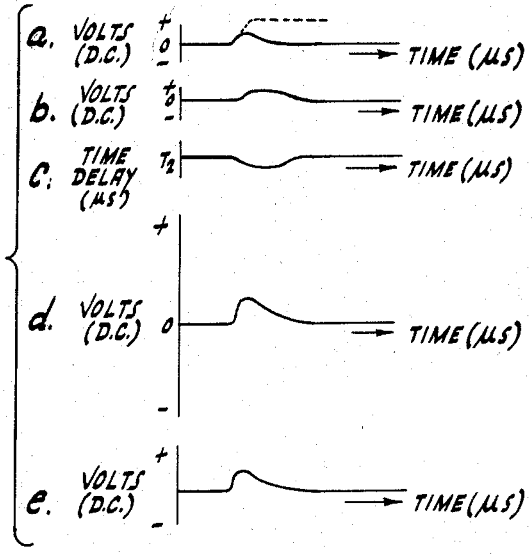
FIG. 5 is a series of curves showing operational characteristics of the system illustrated in FIG. 1.

Assuming the head wheel 20 to slow down slightly, a phase error in the form of a positive voltage appears at the output of the position phase detector 110. This output voltage is indicated by the curve (*a*) in FIG. 5. In the absence of the interlinked position phase detector and the velocity detector system, the error from the phase detector will continue to increase as shown by the dashed line until it is beyond the useful range of the phase detector 110. In the illustrated system provided with the invention, this phase error signal is transmitted through the low pass filter circuit 130. The output of the low pass filter circuit is indicated by the curve (*b*) in FIG. 5. The voltage shown in curve (*b*) is applied to control the delay imparted by the delay multivibrator 62. Curve (*c*) of FIG. 5 shows the variation of time delay from the usual time delay $T_2$ provided by the delay multivibrator 62. The velocity detector immediately responds to this change in position and phase by providing a direct current voltage output as shown by curve (*d*) in FIG. 5. The velocity detector system has a much higher gain because of the trapezoid waveform circuit 60 and the variable delay multivibrator 62 used therein. Accordingly, the phase detector 66 produces an error voltage having a higher amplitude than the phase detector 110. This error voltage is combined with the error voltage from the phase detector as shown in curve (*e*) of FIG. 5 and immediately provides a control voltage for application to the control circuit 120 which causes the head wheel to speed up so that excessive position and speed errors are anticipated and counteracted.

Operating in the same manner, the velocity detector system prevents any overshoot and effectively damps the position error system throughout its dynamic range. This is because phase errors which indicate such overshoot are immediately applied to the velocity detector and the velocity detector provides a signal of proper polarity to damp such overshoot errors before they become excessive.

The velocity detector system, while acting in concert with the phase detector system, functions as a direct current amplifier to amplify the direct current voltages transmitted through the low pass filter 130. It will be observed that the delay multivibrator changes the amplitude variations in the direct current voltage to time variations. These time variations are represented by pulses of varying position in time which are provided by the pulse shaper and amplifier circuit. These amplified pulses are then applied to the phase detector 66 which reconstitutes the direct current signals applied to the delay multivibrator 62, but in amplified form. The velocity detector also provides the additional feature in a velocity detection system of high sensitivity without adverse effects from noise. It will be observed that the velocity detector is operative to convert rate or frequency information into phase information so that a low noise phase detector of conventional design, such as the phase detector 66, may be used. This permits sensitivity throughout the dynamic range of the system and particularly very close to the lock-in frequency of the moving system.

From the foregoing description, it will be apparent that I have provided an improved control system by means of which greater fidelity of reproduction can be obtained in magnetic recording and reproducing by eliminating distortion due to variations in the speed at which a magnetic tape record is scanned. While I have shown a system according to my invention in diagrammatic and schematic form, various components useful therein, as well as variations in the disclosed system themselves all coming within the spirit of the invention, will, no doubt, readily suggest themselves to those skilled in the art. Hence, I desire that the foregoing be considered merely as illustrative and not in a limiting sense.

What is claimed is:

1. A frequency discriminator system which comprises a first monostable multivibrator,
a trapezoid wave generator for providing a trapezoid wave having a sloping portion which is initiated by the leading edge of the output wave from said monostable multivibrator,
a second monostable multivibrator triggered by said first monostable multivibrator upon occurrence of the lagging edge of the output wave from said first monostable multivibrator,
means for providing a sampling pulse upon the occurrence of the lagging edge of the output wave of said second monostable multivibrator which is delayed by a predetermined interval,
and means for comparing said trapezoid wave and said sampling pulse to provide an output signal varying in polarity and magnitude in accordance with time differences therebetween.

2. A control system comprising, in combination,
means for providing a repetitive control signal,
a first monostable multivibrator responsive to said control signal to produce an output wave including a train of pulses,
a trapezoid wave generator for providing a trapezoid wave having a sloping portion which is initiated by the leading edge of each of said pulses in said output wave from said first monostable multivibrator,
a second monostable multivibrator triggered by said output wave from said first monostable multivibrator upon occurrence of the lagging edge of each of said pulses in said output wave from said first monostable multivibrator to produce a second output wave including a train of pulses,
means for providing a sampling pulse upon the occurrence of the lagging edge of each of said pulses in said second output wave from said second monostable multivibrator which is delayed by a predetermined interval,
a phase detector for comparing said sloping portions of said trapezoid wave and said sampling pulses to provide an error signal varying in polarity and magnitude in accordance with the phase differences therebetween,
means for providing a repetitive reference signal,
a second phase comparator for comparing said sloping portions of said trapezoid wave and reference signal to provide a second error signal varying in polarity and magnitude in accordance with the phase differences therebetween,
means including a low pass filter responsive to said second error signal to control the operation of said second monostable multivibrator in response to said output wave from said first monostable multivibrator, and control means responsive to said first and said second signals.

3. In combination, a first monostable multivibrator, a trapezoid wave generator for providing a trapezoid wave having a sloping portion which is initiated by a transition in the level of the output wave from said multivibrator, a second monostable multivibrator triggered by said first multivibrator upon occurrence of a transition different from said first-mentioned transition in the level of the output wave from said first multivibrator, means for providing a sampling pulse upon the occurrence of a given transition in the level of the output wave of said second multivibrator which is delayed by a predetermined interval, and means for comparing said trapezoid wave and said sampling pulse to provide an output signal varying in polarity and magnitude according to the time differences therebetween.

No references cited.

JOHN W. HUCKERT, *Primary Examiner.*